(12) United States Patent
Jung

(10) Patent No.: US 11,047,587 B2
(45) Date of Patent: Jun. 29, 2021

(54) COOLING AND HEATING BANDWIDTH TEMPERATURE CONTROL APPARATUS WITH CENTRAL CONTROLLABILITY

(71) Applicant: WELL-TS CO., LTD., Seoul (KR)

(72) Inventor: Gisu Jung, Gyeonggi-do (KR)

(73) Assignee: WELL-TS CO., LTD., Seoul (KR)

( * ) Notice: Subject to any disclaimer, the term of this patent is extended or adjusted under 35 U.S.C. 154(b) by 0 days.

(21) Appl. No.: 16/507,199

(22) Filed: Jul. 10, 2019

(65) Prior Publication Data

US 2021/0010708 A1 Jan. 14, 2021

(51) Int. Cl.
| | |
|---|---|
| F24F 11/46 | (2018.01) |
| F24F 11/56 | (2018.01) |
| F24F 11/64 | (2018.01) |
| F24F 11/65 | (2018.01) |
| G05B 15/02 | (2006.01) |
| F24F 11/88 | (2018.01) |
| F24F 140/60 | (2018.01) |
| F24F 130/10 | (2018.01) |

(Continued)

(52) U.S. Cl.
CPC ............. *F24F 11/46* (2018.01); *F24F 11/56* (2018.01); *F24F 11/64* (2018.01); *F24F 11/65* (2018.01); *F24F 11/88* (2018.01); *G05B 15/02* (2013.01); *F24F 2110/10* (2018.01); *F24F 2110/12* (2018.01); *F24F 2130/10* (2018.01); *F24F 2140/60* (2018.01)

(58) Field of Classification Search
CPC .. F24F 11/46; F24F 11/64; F24F 11/88; F24F 11/65; F24F 11/56; F24F 2140/60; F24F 2130/10; F24F 2110/10; F24F 2110/12; F24F 11/67; G05B 15/02; G05D 23/1919
See application file for complete search history.

(56) References Cited

U.S. PATENT DOCUMENTS 4,775,099 A * 10/1988 Podlipnik .......... G05D 23/2754
165/258
8,339,761 B2 * 12/2012 Yamada ............... H01H 47/002
361/160

(Continued)

FOREIGN PATENT DOCUMENTS

| KR | 100794602 B1 | 1/2008 |
| KR | 101554180 B1 | 9/2015 |
| KR | 101880429 B1 | 7/2018 |

*Primary Examiner* — Thomas C Lee
*Assistant Examiner* — Ameir Myers
(74) *Attorney, Agent, or Firm* — J.A. Lindeman & Co., PLLC

(57) ABSTRACT

The present invention provides a cooling and heating bandwidth temperature control apparatus, comprising: a cooling and heating temperature control apparatus; a first temperature sensor for detecting a temperature; first and second lines for connecting the first temperature sensor to the cooling and heating temperature control apparatus; and a first relay for determining a connection between cut contacts of the first line and cut contacts of the second line, where if the first relay is in a contact, the first temperature sensor is connected to the cooling and heating temperature control apparatus, and if the first relay is in a contact, the cooling and heating temperature control apparatus is connected to a high temperature control resistor or a low temperature control resistor through a second relay so as to control a temperature in a bandwidth.

7 Claims, 10 Drawing Sheets

(51) Int. Cl.
*F24F 110/10* (2018.01)
*F24F 110/12* (2018.01)

(56) References Cited

U.S. PATENT DOCUMENTS

2014/0148967 A1* 5/2014 Bayfus .................... D06F 33/00
　　　　　　　　　　　　　　　　　　　　　　　700/299
2016/0123588 A1* 5/2016 Vie ......................... F23N 5/242
　　　　　　　　　　　　　　　　　　　　　　　431/18

* cited by examiner

COOLING AND HEATING BANDWIDTH TEMPERATURE CONTROL APPARATUS WITH CENTRAL CONTROLLABILITY

RELATED APPLICATIONS

This application is related to Korean Patent Application No. 10-2017-0165950 filed Dec. 5, 2017, the entire content of which is incorporated herein by reference.

FIELD OF THE DISCLOSURE

The present invention relates to a cooling and heating temperature control apparatus that can be controlled centrally in an integrated manner. Recently, HVAC (heating, ventilation, and air conditioning) systems have gained popularity for its capability of cooling and heating using one unit. Therefore, the present invention relates to a bandwidth temperature control apparatus that can control temperatures centrally in an integrated manner rather than controlling temperatures individually, and that can control temperatures simply in bandwidths in combination with a temperature sensor.

BACKGROUND

As smart buildings are on the rise and HVAC systems that can control both cooling and heating with one unit are installed quite commonly these days, there has been a need for a technology that can manage an HVAC system centrally in an integrated manner.

To this end, LG Electronics, which is a major consumer electronics company in the Republic of Korea, proposed apparatus and method for controlling operation of multi-air-conditioning systems in Korean Patent Registration No. KR10-1554180 (Publication date: Sep. 18, 2015) (hereinafter, referred to as Patent Document 1) as a method for controlling a plurality of multi-air-conditioner systems.

Patent Document 1 has a technical feature of controlling a plurality of multi-air-conditioner systems based on the rate of the outdoor temperature following the set temperature of an indoor unit after setting the temperature for the indoor unit.

In addition, Samsung Electronics, which is another major electronics company in the Republic of Korea, presented apparatus for operating peak power of a system air conditioner and a method for controlling the same in Korean Patent Registration No. KR10-0794602 (Publication date: Jan. 14, 2008) (hereinafter, referred to as Patent Document 2).

Patent Document 2 provides an operation mode for peak power of a system air conditioner, by determining whether it is in peak power, by detecting a current operation mode, an indoor temperature, and temperatures at inlet and outlet of a heat exchanger, and by changing an operation mode based on a determined operation mode. Accordingly, there are the following prior art documents in relation to an apparatus for controlling cooling and heating temperatures.

PRIOR ART DOCUMENTS

Patent Documents

1. Korean Patent Registration No. 10-1554180 (Sep. 18, 2015)
2. Korean Patent Registration No. 10-0794602 (Jan. 14, 2008)

SUMMARY

The present invention is designed to provide a bandwidth temperature control apparatus for cooling and heating, which can be controlled centrally in an integrated manner, unlike prior art cooling and heating temperature control apparatus. The temperature control apparatus presented has a technical feature that for a first temperature sensor 11 of a cooling and heating temperature control apparatus 10, a low temperature is set for the summer season and a high temperature is set for the winter season. Therefore, it is an object of the present invention to enable facile integrative temperature control of an entire cooling and heating temperature control apparatus 10 in bandwidths, by connecting to part of a temperature sensor of a cooling apparatus (air conditioner), heating apparatus (heater), or cooling and heating apparatus (HVAC system), etc.

The present invention has a technical feature that a first line 24 and a second line 25 connecting a first temperature sensor 11 to a cooling and heating temperature control apparatus 10 are cut, and only two relays consisting of a first relay 20 and a second relay 21 are used between the cut contacts X, X' of the first line 24 and the cut contacts Y, Y' of the second line 25 so as to set low and high temperatures. Another technical feature is that the first and second relays 20, 21 connect the cooling and heating temperature control apparatus 10 to a low temperature control resistor 19 and a high temperature control resistor 19. Among other things, the first relay 20 determines connection of the cooling and heating temperature control apparatus (HVAC system) 10 to the first temperature sensor 11, and the second relay 21 serves to determine the low and high temperatures. At the same time, a second temperature sensor 70 detects a current temperature via an A/D (analog-digital) converter 60 and forward it to a main controller 23. In this way, using a cooling and heating bandwidth temperature control unit 400 arranged between the cooling and heating temperature control apparatus 10 and the first temperature sensor 11, it is possible to control a temperature in bandwidths between low and high temperatures in a simple and inexpensive manner. Furthermore, because a reference temperature Tref is provided to the main controller 23 from the center through an external communication IC 26, it is possible to control all of the cooling and heating temperature control apparatus 10 centrally in an integrated manner, so as to provide a means for achieving the object of the present invention.

The present invention has a technical feature that a first line 24 and a second line 25 connecting a first temperature sensor 11 to a cooling and heating temperature control apparatus 10 are cut, and between the cut contacts X, X' of the first line 24 and the cut contacts Y, Y' of the second line 25 is inserted a cooling and heating bandwidth temperature control unit 400 for setting low and high temperatures by using only two relays of a first relay 20 and a second relay 21. The temperature control apparatus comprising the cooling and heating bandwidth temperature control unit 400 of the present invention has a technical feature that instead of using an internal controller of the cooling and heating temperature control apparatus (HVAC system) 10, the first and second lines 24, 25 connecting the first temperature sensor 11 to the cooling and heating temperature control apparatus (HVAC system) are cut, and the cooling and heating bandwidth temperature control unit 400 of the present invention is inserted between the cut contacts. In this way, first, it is very simple and easy to install the temperature control apparatus of the present invention in a cooling and heating temperature control apparatus (HVAC system) 10. Second, it is inexpensive to implement because merely two relays (first and second relays 20, 21), temperature control resistors 18, 19, and a main controller 23 are employed to control temperatures. Third, it is possible to control the reference temperature Tref of entire cooling and heating temperature control apparatus 10 centrally in an integrated manner, using a simple external communication IC 26 connected to the main controller 11. Fourth, it is possible to provide an enhanced effect of implementing a bandwidth temperature control apparatus in a very simple manner.

DETAILED DESCRIPTION OF THE PREFERRED EMBODIMENTS

The present invention will be described in detail with reference to the accompanying drawings as follows.

Figure 1:
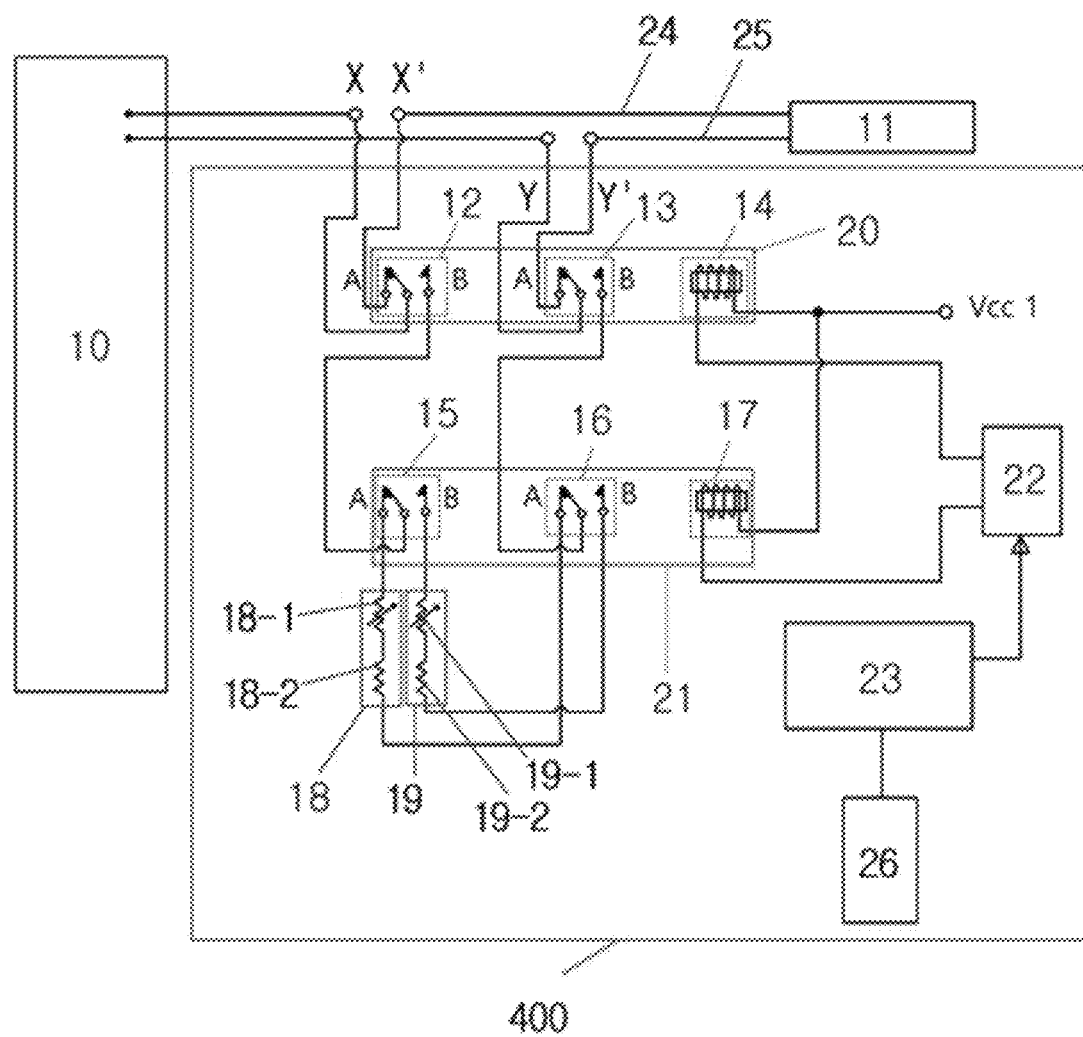
FIG. 1 shows a cooling and heating bandwidth temperature control apparatus that can be controlled centrally (in a normal state during the winter season), according to the present invention.

FIG. 1 shows a cooling and heating bandwidth temperature control apparatus that can be controlled centrally (in a normal state during the winter season), according to the present invention. In FIG. 1, a key feature of the present invention is that a first line 24 and a second line 25 connecting between a cooling and heating temperature control apparatus 10 and a first temperature sensor 11, which is a temperature sensor of the cooling and heating temperature control apparatus 10, are cut, and a cooling and heating bandwidth temperature control unit 400 proposed by the present invention is inserted between cut contacts X, X' of the first line 24 and cut contacts Y, Y' of the second line 25. The cooling and heating bandwidth temperature control unit 400 comprises simply two relays of a first relay 20 and a second relay 21, two resistors of a high temperature control resistor 18 and a low temperature control resistor 19, a relay drive IC 22 for controlling the first and second relays 20, 21, a main controller 23 for controlling the entirety of the apparatus, and an external communication IC 26 for connecting the main controller 23 to external communications.

A main advantage of the temperature control apparatus shown in FIG. 1 is that it is easy and simple to install and remove the temperature control apparatus, among other things. In other words, it only needs to cut the first line 24 and the second line 25 connecting between the cooling and heating temperature control apparatus 10 and the first temperature sensor 11, which is the temperature sensor of the cooling and heating temperature control apparatus 10, and to place the temperature control apparatus described above at the cut contacts, thereby providing an advantage of easy and simple installation and removal as well as a low cost from a simple structure.

Each cooling and heating temperature control apparatus (HVAC system) 10 may be set for its temperature independently by individual users. In particular, a user may want to set an indoor temperature to be higher in the winter and to set the indoor temperature to be lower in the summer. Such temperature settings are more of a human instinct to cope with cold and hot weather conditions.

Without a control device for limiting a temperature within a proper range, a user may increase the temperature too high in the winter and decrease the temperature too low in the summer. In other words, if a user leaves his or her home without turning off the cooling and heating temperature control apparatus (HVAC system) 10, a waste of energy in both winter and summer could be significant.

For such basic temperature settings by a user, the present invention is characterized by further adding a functionality capable of setting low and high temperatures. Thus, a key feature of the present invention is that even if a user leaves home without turning off the cooling and heating temperature control apparatus (HVAC system) 10, it is possible to control the temperature of the cooling and heating temperature control apparatus (HVAC system) 10 in bandwidths within the range of the set low temperature or set high temperature, thereby effectively saving energy.

To describe a detailed operation in FIG. 1 (a normal state in the winter season), assuming that a high temperature TH for the winter season is set to 30° C., FIG. 1 shows the connection of the temperature control apparatus of the present invention when a temperature is below 30° C. A technical feature is that the first relay 20 is connected to a contact A and the second relay 21 is connected to a contact B, and the cooling and heating temperature control apparatus (HVAC system) 10 is normally connected to the first temperature sensor 11 so as to carry out heating. The cooling and heating temperature control apparatus (HVAC system) 10 is set to perform heating when the temperature is below 30° C. of the set high temperature.

Figure 2:
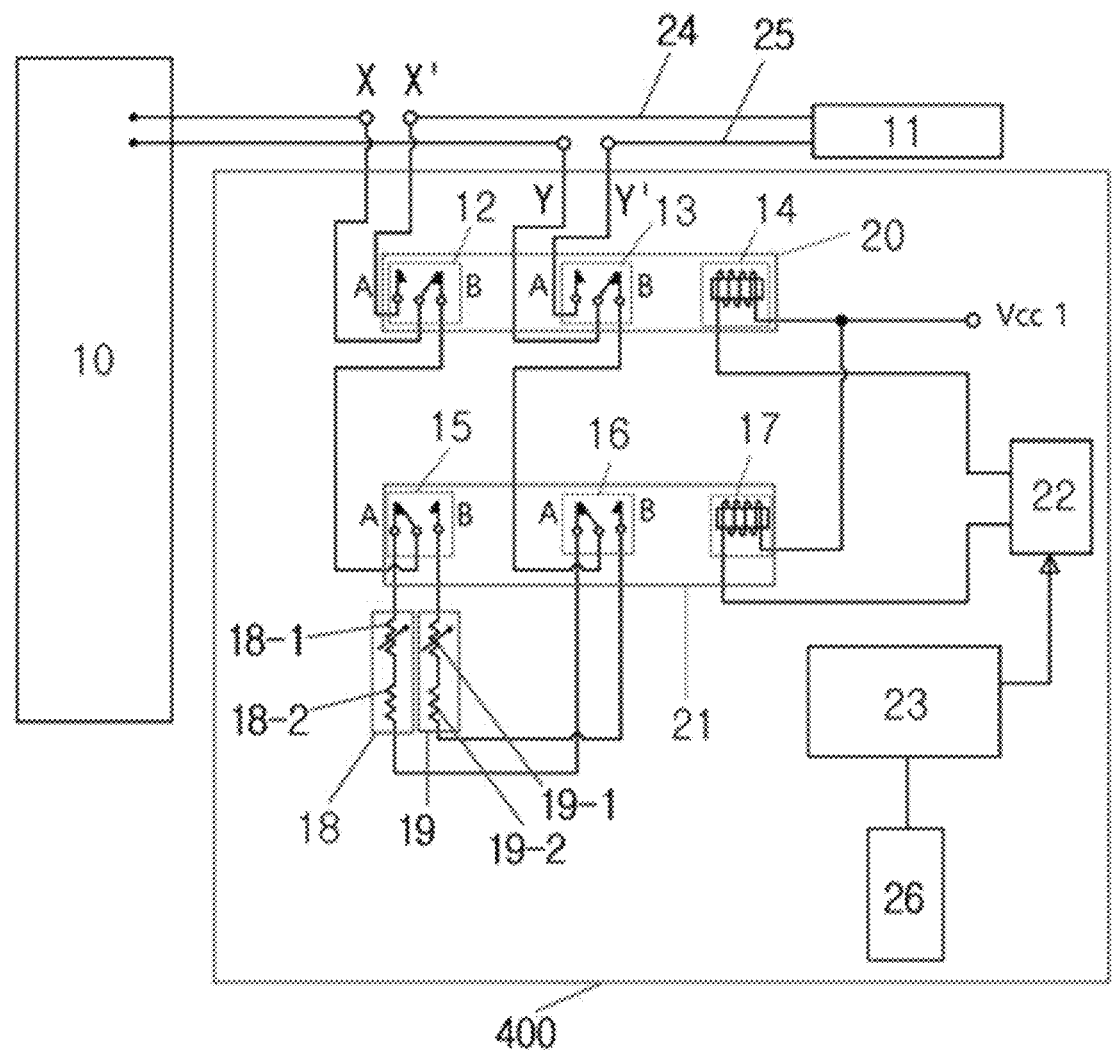
FIG. 2 shows the cooling and heating bandwidth temperature control apparatus that can be controlled centrally (in a state when a set high temperature is reached during the winter season), according to the present invention.

FIG. 2 illustrates the cooling and heating bandwidth temperature control apparatus that can be controlled centrally (in a state when the set high temperature is reached during the winter season), according to the present invention. FIG. 2 (in a state when the set high temperature is reached during the winter season) is a case where a user does not control the temperature even if the temperature has reached at 30° C. of the set high temperature. In this case, a technical feature is that the first relay 20 moves from the contact A to contact B. At this time, the connection between the cooling and heating temperature control apparatus (HVAC system) 10 and the first temperature sensor 11 is cut off. In an analysis of the connection between the cut contacts X, X' of the first line 24 and the cut contacts Y, Y' of the second line 25, the contact X is connected to the high temperature control resistor 18 through a contact B of a first switch section 12 of the first relay 20 and through a contact A of a first switch section 15 of the second relay 21. In addition, the high temperature control resistor 18 is connected to the cooling and heating temperature control apparatus (HVAC system) 10 through a contact A of a second switch section 16 of the second relay 21 and through a contact B of a second switch section 13 of the first relay 20 and the contact X'.

In other words, the cooling and heating temperature control apparatus (HVAC system) 10 recognizes the value of the high temperature control resistor 18 as a detected temperature. Since the temperature has already reached at 30° C. of the set high temperature, the cooling and heating temperature control apparatus (HVAC system) 10 is turned off to stop operating.

Figure 3:
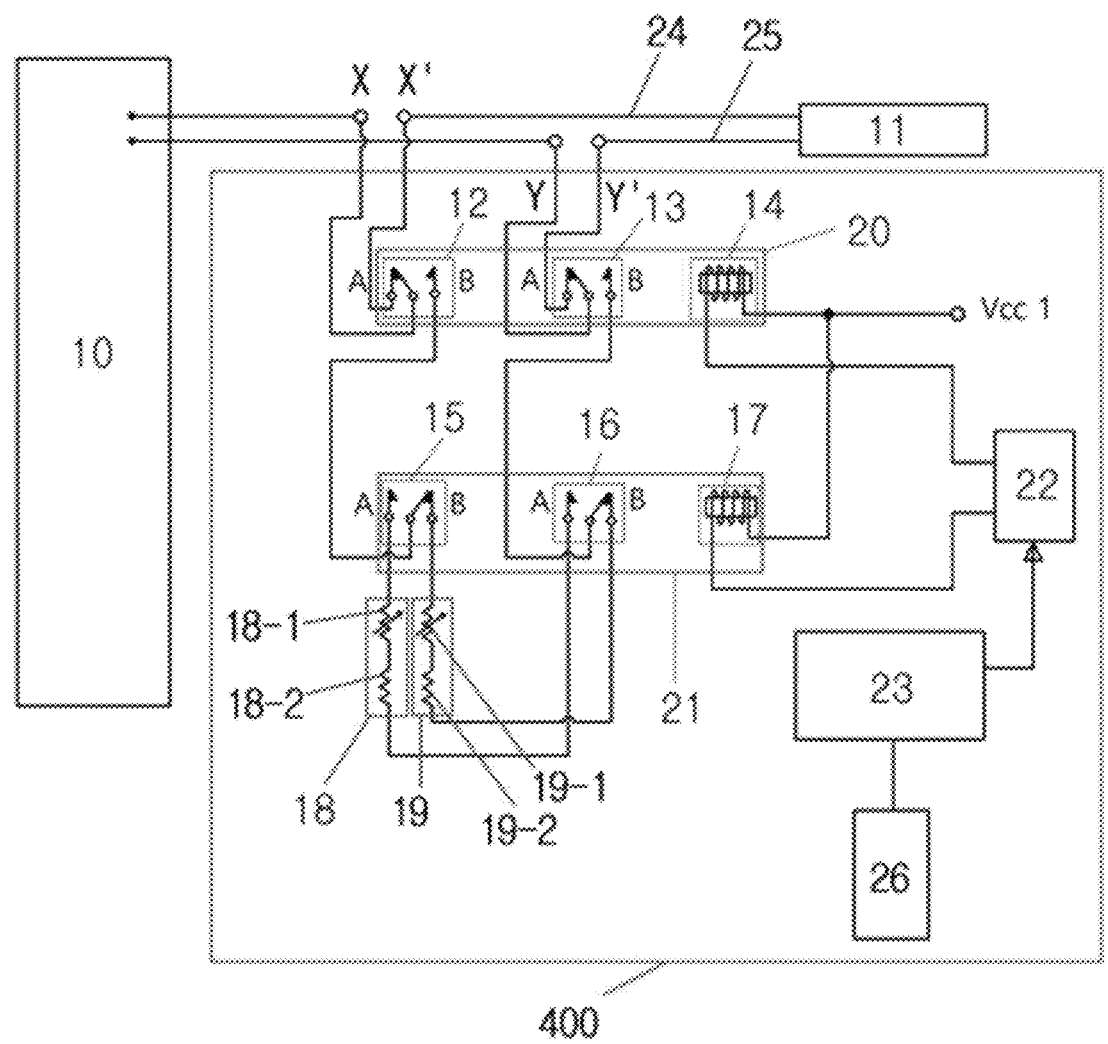
FIG. 3 shows the cooling and heating bandwidth temperature control apparatus that can be controlled centrally (in a normal state during the summer season), according to the present invention.

FIG. 3 shows the cooling and heating bandwidth temperature control apparatus that can be controlled centrally (in a normal state during the summer season), according to the present invention. In FIG. 3 (in a normal state during the summer season), a technical feature is that the first relay 20 is connected to the contact A and the second relay 21 is connected to the contact B. In other words, a low temperature TL is set for the summer season, and the low temperature TL is set by a low temperature control resistor 19.

In FIG. 3, if a low temperature is set to 18° C. for the summer season, for example, then when the temperature is at 18° C. or higher, the cooling and heating temperature control apparatus (HVAC system) 10 is connected to the first temperature sensor 11 so as to perform cooling in a normal operation.

Figure 4:
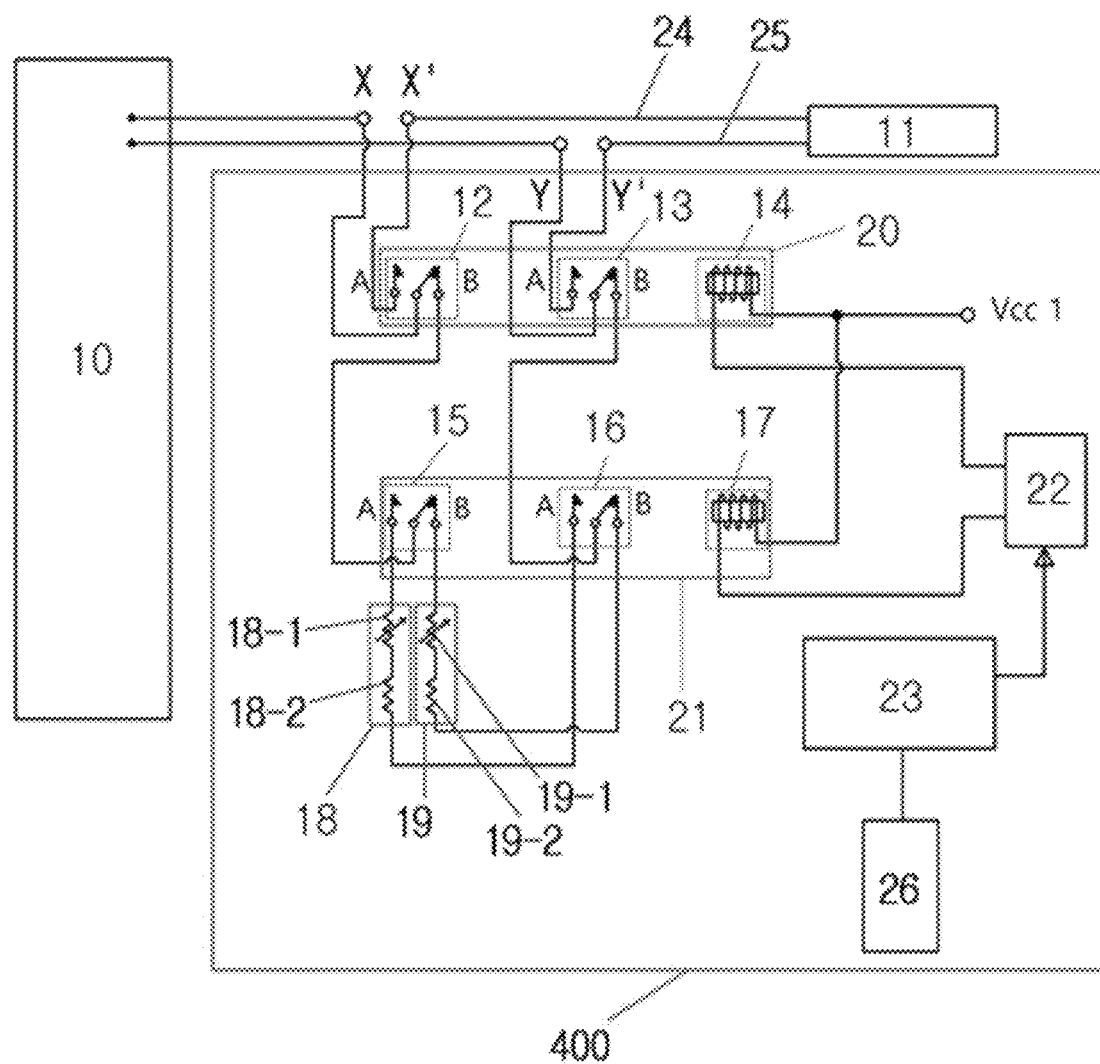
FIG. 4 shows the cooling and heating bandwidth temperature control apparatus that can be controlled centrally (in a state when a set low temperature is reached during the summer season), according to the present invention.

FIG. 4 illustrates the cooling and heating bandwidth temperature control apparatus that can be controlled centrally (in a state when the set low temperature is reached during the summer season), according to the present invention. In FIG. 4 (in a state when the set low temperature is reached during the summer season), for example, if an actual temperature reaches at 18° C. of the set low temperature, then the first relay 20 moves from the contact A to the contact B. In this case, for the connection between the cut contacts X, X' of the first line 24 and the cut contacts Y, Y' of the second line 25, the contact X is connected to the low temperature control resistor 19 through the contact B of the first switch section 12 of the first relay 20 and through the contact A of the first switch section 15 of the second relay 21. In addition, the low temperature control resistor 19 is connected to the cooling and heating temperature control apparatus (HVAC system) 10 through the contact B of the second switch section 16 of the second relay and through the contact B of the second switch section 13 of the first relay and the contact X'. In other words, the cooling and heating temperature control apparatus (HVAC system) 10 recognizes the value of the low temperature control resistor 18 as a detected temperature. Since the temperature has already reached at 18° C. of the set low temperature, the cooling and heating temperature control apparatus (HVAC system) 10 is turned off to stop operating.

For a key relay in the present invention, it is a technical feature to use a relay in which two switches within a single relay act simultaneously as the contact A or contact B. Though the present invention employs Panasonic DS2y relays for the elements of the first and second relays 20, 21, any relay may be used as long as two switches within a single relay act simultaneously as the contact A or contact B.

Figure 5:
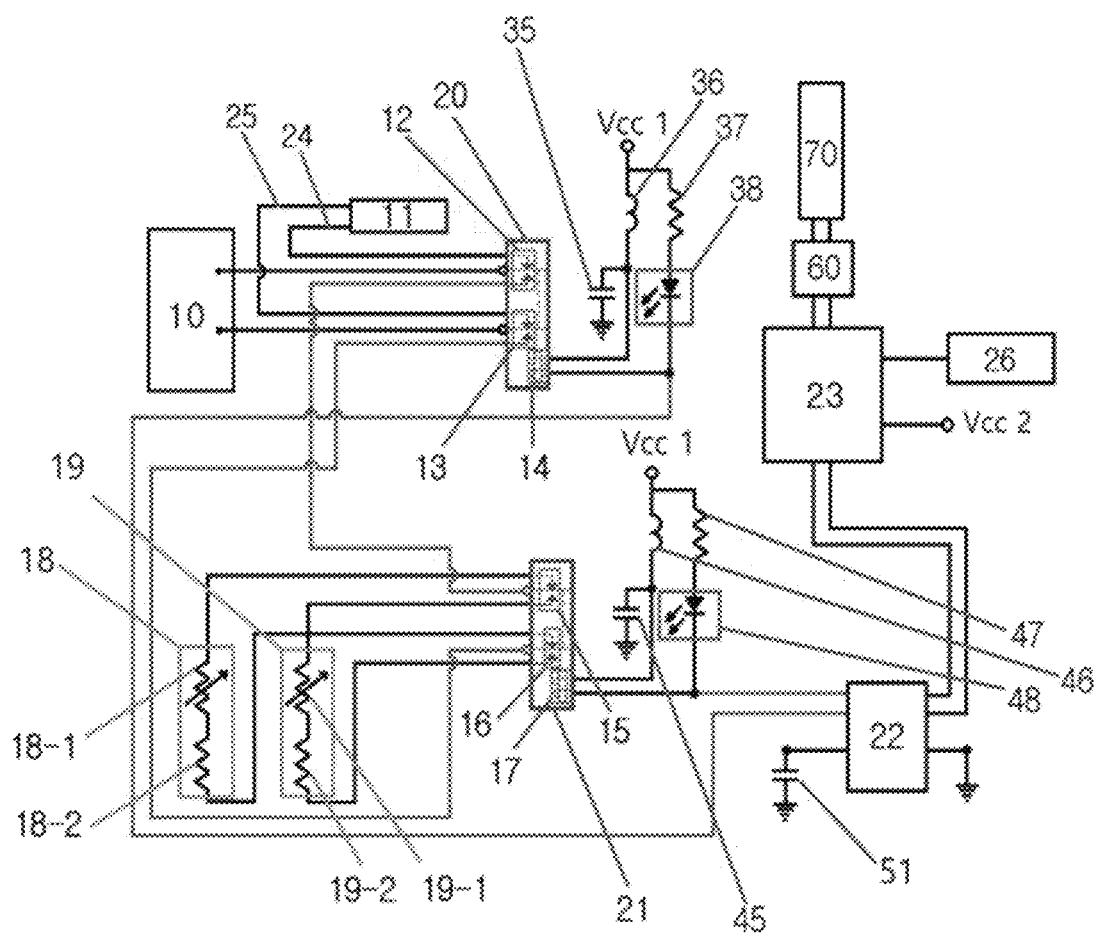
FIG. 5 is a detailed circuit diagram of the cooling and heating bandwidth temperature control apparatus that can be controlled centrally, according to the present invention.

FIG. 5 is the representative drawing of the present invention, which shows a detailed circuit diagram of the cooling and heating bandwidth temperature control apparatus that can be controlled centrally. FIG. 5 illustrates a technical feature that a second temperature sensor 70 is connected to a main controller 23 through an A/D converter 60, among other things. The second temperature sensor 70 detects an actual temperature and forward it to the main controller 23. In this way, the main controller 23 can control the temperature in bandwidths, which is a main feature of the present invention.

As discussed above with reference to FIGS. 1 and 2, it is assumed that the main controller 23 sets a high temperature for the winter season to 30° C., for example. The first relay 20 determines whether or not to connect the first temperature sensor 11 to the cooling and heating temperature control apparatus (HVAC system) 10. If the temperature stays below 30° C. of the set high temperature in the winter season, then the first relay 20 connects to the contact A so as to connect the cooling and heating temperature control apparatus (HVAC system) 10 to the first temperature sensor 11 in a normal state, so that the cooling and heating temperature control apparatus (HVAC system) 10 operates to provide heating.

If the cooling and heating temperature control apparatus (HVAC system) 10 keeps running to provide heating so that the temperature of the first temperature sensor 11 reaches at 30° C. of the set high temperature, then the first relay 20 operates to move from the contact A to the contact B, and the detected temperature by the cooling and heating temperature control apparatus (HVAC system) 10 is set as the value of the high temperature control resistor 18. As such, the cooling and heating temperature control apparatus (HVAC system) 10 is turned off, and the temperatures gradually goes down because no more heating is provided.

In this case, the main controller 23 receives a set reference temperature from the center through an external communication IC 26. If it is assumed that the set reference temperature Tref received from the center through the external communication IC 26 is 25° C. and the temperature gradually goes down to reach at 25° C., then the first relay 20 operates to move from the contact B to the contact A. Consequently, as the cooling and heating temperature control apparatus (HVAC system) 10 detects the temperature of the first temperature sensor 11, it begins heating again. In this way, the temperature may be controlled in a bandwidth between the set high temperature of 30° C. and the reference temperature of 25° C.

As discussed above with reference to FIGS. 3 and 4, a low temperature is set for the summer season, in contrast to the winter season. If the low temperature is set to 18° C. for the summer season, the cooling and heating temperature control apparatus (HVAC system) 10 operates to provide cooling and receives temperature data from the first temperature sensor 11 while the temperature stays above 18° C. However, if the temperature of the first temperature sensor 11 reaches at 18° C. of the set low temperature, then the first relay 20 operates to move from the contact A to the contact B and the detected temperature by the cooling and heating temperature control apparatus (HVAC system) 10 is set as the value of the low temperature control resistor 19. As such, the cooling and heating temperature control apparatus (HVAC system) 10 is turned off, and the temperature gradually goes up because no cooling is provided any more.

In this case, the main controller 23 receives a set reference temperature Tref from the center through the external communication IC 26. If it is assumed that the set reference temperature received from the center through the external communication IC 26 is 22° C. and the temperature gradually goes up to reach at 22° C., then the first relay 20 operates to move from the contact B to the contact A. Consequently, as the cooling and heating temperature control apparatus (HVAC system) 10 detects the temperature of the first temperature sensor 11, it begins cooling again. In this way, the temperature may be controlled in a bandwidth between the set low temperature of 18° C. and the reference temperature of 22° C.

Figure 6:
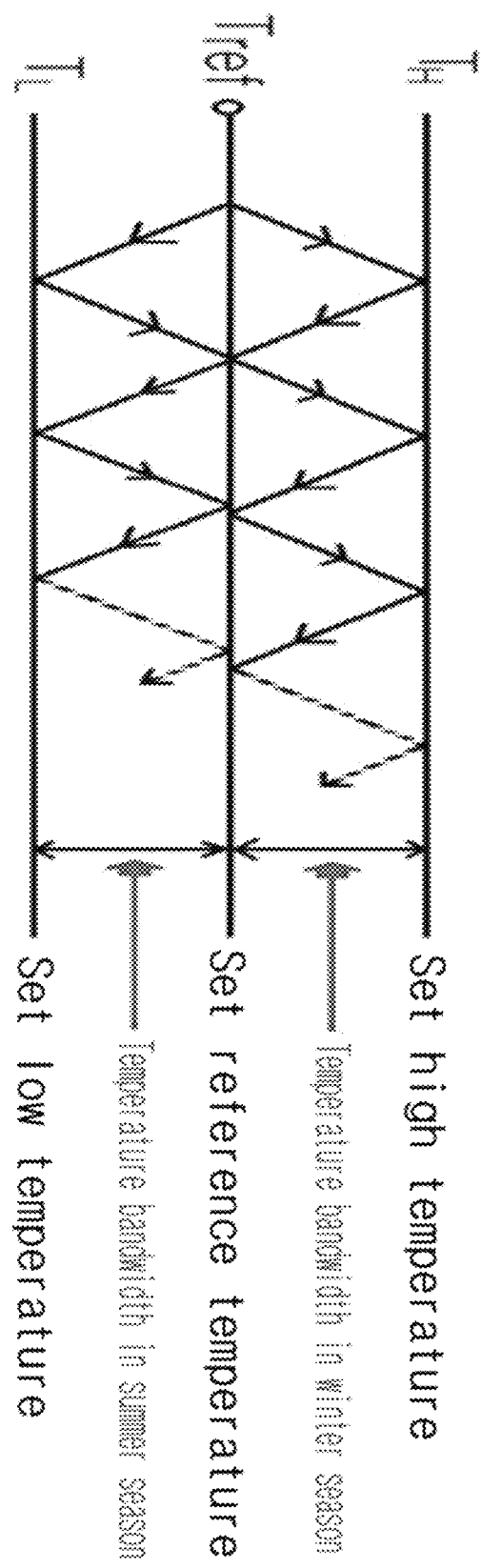
FIG. 6 shows temperature control in the winter and summer.

FIG. 6 shows temperature control in the winter and summer. Taking the previous description as an example, a technical feature is that the temperature is controlled in a bandwidth between the set high temperature of 30° C. and the reference temperature of 25° C. in the winter season, and the temperature is controlled in a bandwidth between the set low temperature of 18° C. and the reference temperature of 22° C. in FIG. 6.

The high temperature TH may be varied by a high temperature control variable-resistor 18-1 of the high temperature control resistor 18, and the low temperature TL may be varied by a low temperature control variable-resistor 19-1 of the low temperature control resistor 19. A technical feature is that the reference temperature Tref may also be input in advance at the main controller 23, and may be received collectively from the center through the external communication IC 26.

Figure 7:
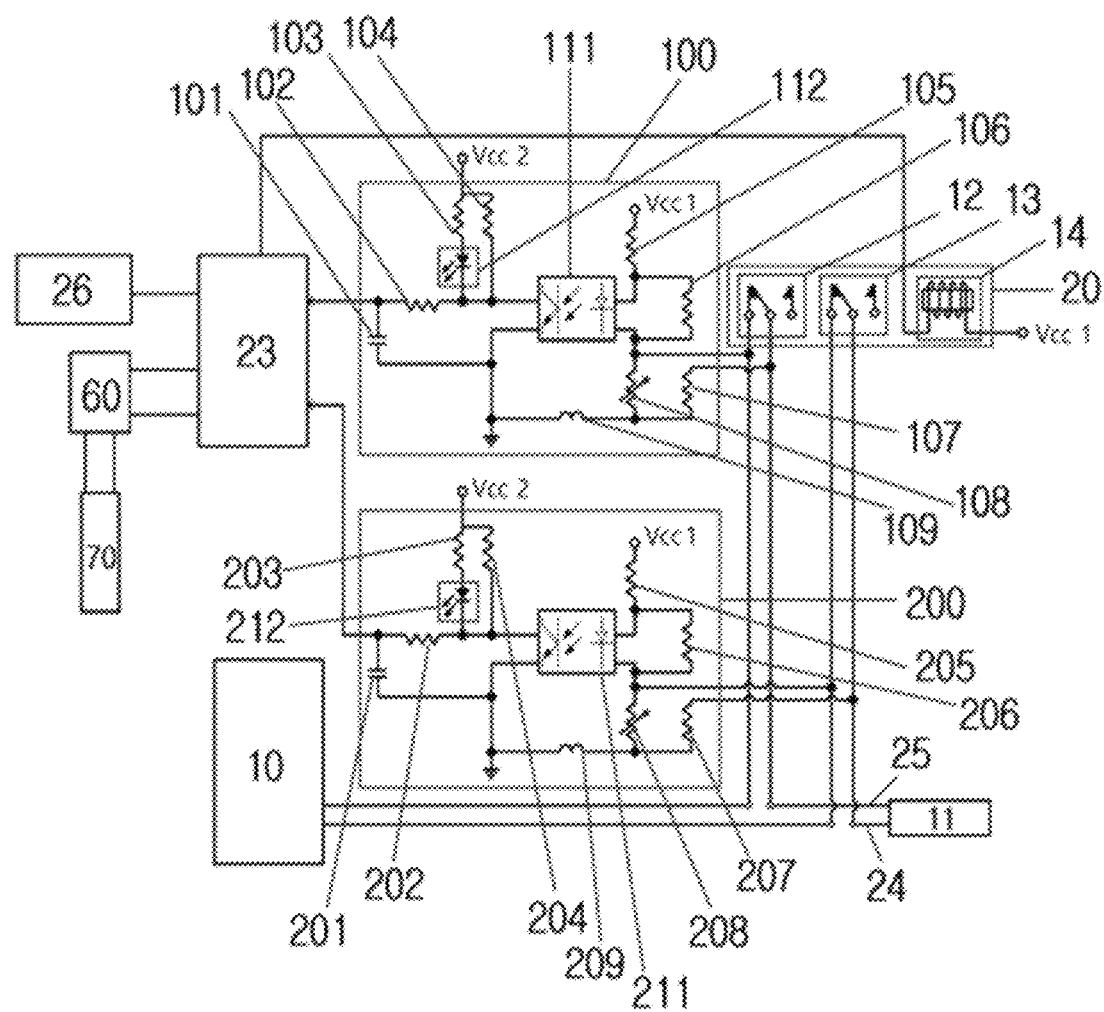
FIG. 7 is a detailed circuit diagram illustrating detection of relay operation.

FIG. 7 is a detailed circuit diagram illustrating detection of relay operation. A technical feature is that the detection of whether the first relay 20 is in the contact A or contact B is carried out by means of first and second photocouplers 111, 211. The detection of whether the first switch section 12 of the first relay is in the contact A or contact B is carried out by means of the first photocoupler 111 through a $16^{th}$ resistor 107 and an $11^{th}$ variable resistor 108. Further, the detection of whether the second switch section 13 of the first relay is in the contact A or contact B is carried out by means of the second photocoupler 211 through a $26^{th}$ resistor 207 and a $21^{th}$ variable resistor 208, and the detected information is routed to the main controller 23. Accordingly, a technical feature is that the main controller 23 receives the reference temperature Tref from the center through the external communication IC 26, detects whether the first relay 20 is in the contact A or contact B by means of the first and second photocoupler 111, 211, and simultaneously controls the temperature in bandwidths between the reference temperature Tref and the low temperature TL and high temperature TH.

Figure 8:
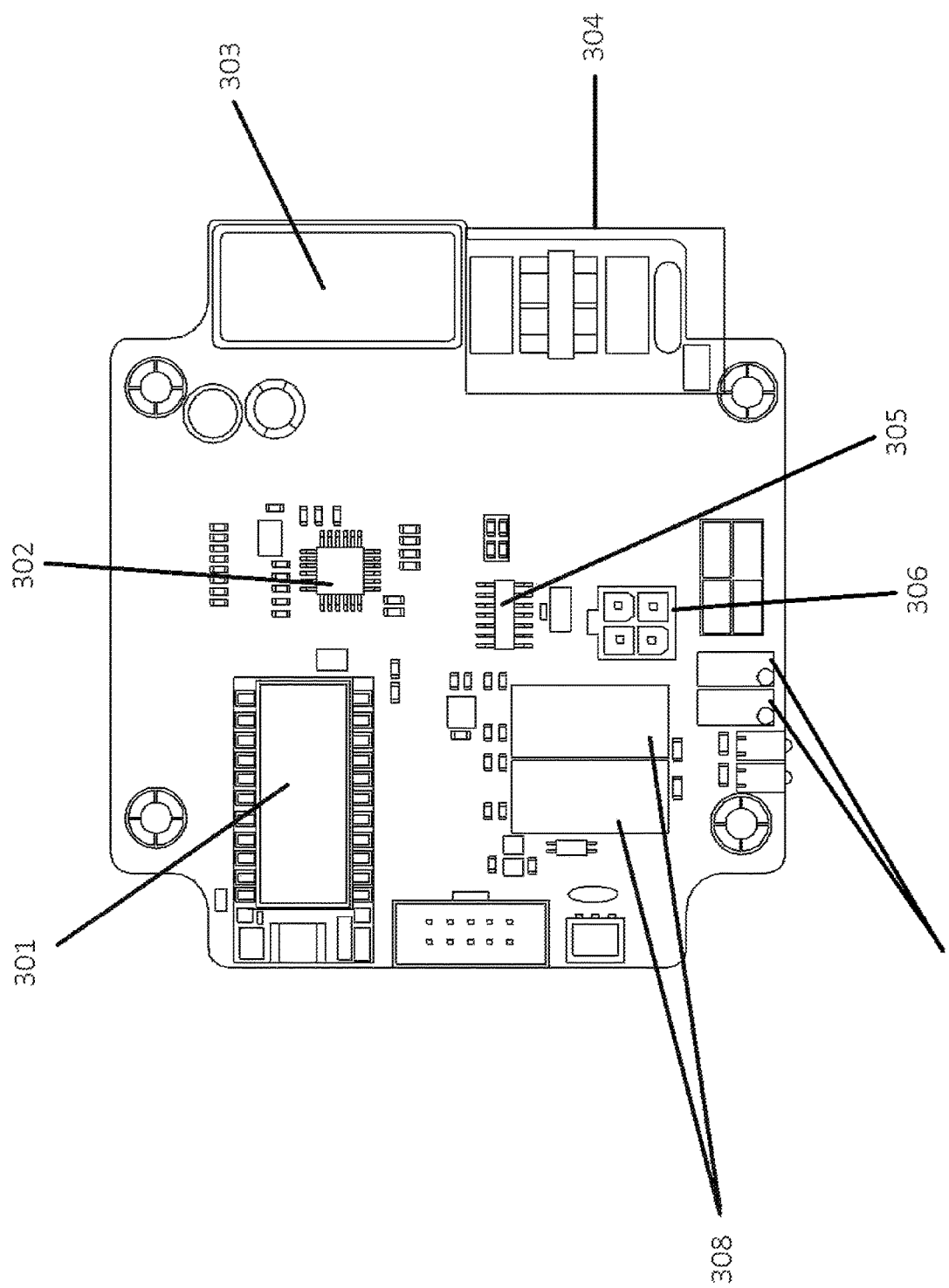
FIG. 8 is a plan view of a constructed, cooling and heating bandwidth temperature control apparatus.
Figure 9:
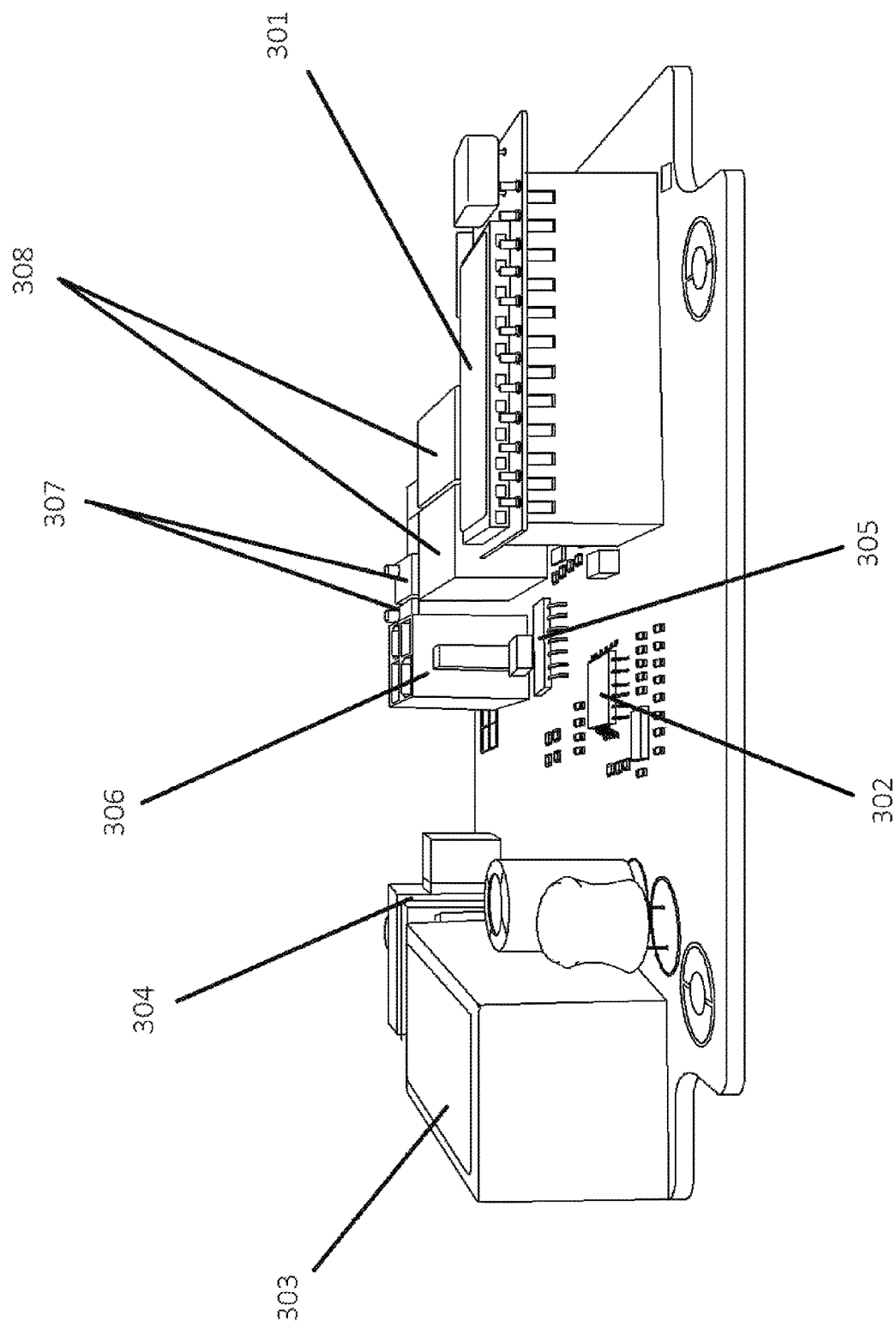
FIG. 9 is a left side view of the constructed, cooling and heating bandwidth temperature control apparatus.
Figure 10:
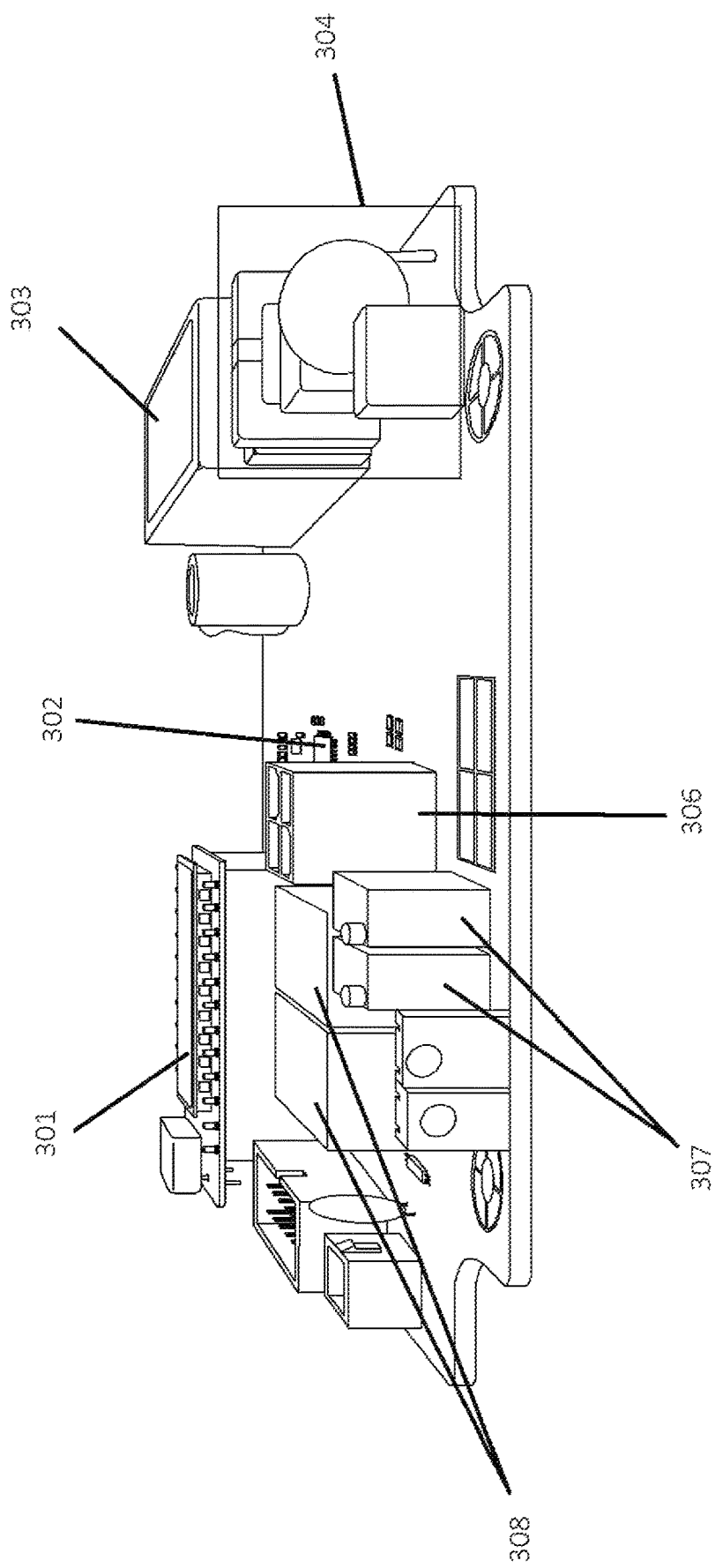
FIG. 10 is a right side view of the constructed, cooling and heating bandwidth temperature control apparatus.

FIGS. 8 to 10 show a physically constructed, cooling and heating bandwidth temperature control apparatus and elements thereof.

The present invention proposes a cooling and heating bandwidth temperature control apparatus, comprising: a cooling and heating temperature control apparatus 10; a first temperature sensor 11 for detecting a temperature; first and second lines 24, 25 for connecting the first temperature sensor 11 to the cooling and heating temperature control apparatus 10; and a first relay 20 for determining a connection between cut contacts X, X' of the first line 24 and cut contacts Y, Y' of the second line 25, where if the first relay 20 is in a contact A, the first temperature sensor 11 is connected to the cooling and heating temperature control apparatus 10, and if the first relay 20 is in a contact B, the cooling and heating temperature control apparatus 10 is connected to a high temperature control resistor 18 or a low temperature control resistor 19 through a second relay 21 to control a temperature in a bandwidth.

In addition, the present invention proposes a cooling and heating bandwidth temperature control apparatus, comprising: a cooling and heating temperature control apparatus 10; a first temperature sensor 11 for detecting a temperature; first and second lines 24, 25 for connecting the first temperature sensor 11 to the cooling and heating temperature control apparatus 10; a first relay 20 for determining a connection between cut contacts X, X' of the first line 24 and cut contacts Y, Y' of the second line 25; a second relay 21 for determining a connection to a high temperature control resistor 18 or to a low temperature control resistor 19; and a relay drive IC 22 for driving the first and second relays 20, 21.

Furthermore, the present invention proposes a cooling and heating bandwidth temperature control apparatus, comprising: a cooling and heating temperature control apparatus 10; a first temperature sensor 11 for detecting a temperature; first and second lines 24, 25 for connecting the first temperature sensor 11 to the cooling and heating temperature control apparatus 10; a first relay 20 for determining a connection between cut contacts X, X' of the first line 24 and cut contacts Y, Y' of the second line 25; a second relay 21 for determining a connection to a high temperature control resistor 18 or to a low temperature control resistor 19; the first relay 20 comprising a first switch section 12 of the first relay and a second switch section 13 of the first relay; the second relay 21 comprising a first switch section 15 of the second relay and a second switch section 16 of the second relay; a first relay control electromagnet 14 for directing the first switch section 12 of the first relay 20 and the second switch section 13 of the first relay 20 to a contact A or contact B; a second relay control electromagnet 17 for directing the first switch sections 15 of the second relay 21 and the second switch section 16 of the second relay 21 to the contact A or contact B; a relay drive IC 22 for driving the first and second relays 20, 21; a high temperature control resistor 18 for setting a high temperature TH; and, a low temperature control resistor 19 for setting a low temperature TL; where after receiving a set reference temperature Tref from an external communication IC 26, an actual temperature is controlled between the high temperature TH and the reference temperature Tref, or the actual temperature is controlled between the low temperature TL and the reference temperature Tref.

A feature is that the first and second relays 20, 21 are a relay that two switches in a single relay act simultaneously as the contact A or contact B, and a cooling and heating temperature bandwidth temperature control unit 400 is provided between the cooling and heating temperature control apparatus 10 and the first temperature sensor 11. In addition, it is another feature that the detection of whether the first switch section 12 of the first relay is in the contact A or contact B is carried out by means of a first photocoupler 111, and that the detection of whether the second switch section 13 of the first relay is in the contact A or contact B is carried out by means of a second photocoupler 211 and is forward to a main controller 23.

The present invention may be applied to a cooling and heating bandwidth temperature control apparatus by a person having ordinary skill in the art through various modifications and changes, and it should be understood that simple technical modifications will still fall within the scope of protection of the present invention.

REFERENCE NUMERALS

10: Cooling and heating temperature control apparatus (HVAC system)
11: First temperature sensor 12: First switch section of a first relay
13: Second switch section of a first relay
14: First relay control electromagnet
15: First switch section of a second relay
16: Second switch section of a second relay
17: Second relay control electromagnet
18: High temperature control resistor
18-1: High temperature control variable-resistor
18-2: High temperature control fixed-resistor
19: Low temperature control resistor
19-1: Low temperature control variable-resistor
19-2: Low temperature control fixed-resistor
20: First relay
21: Second relay
22: Relay drive IC
23: Main controller
24: First line
25: Second line
26: External communication IC
35: First capacitor
36: First inductor
37: First resistor
38: First LED
45: Second capacitor
46: Second inductor
47: Second resistor
48: Second LED
51: Third capacitor
60: A/D converter
70: Second temperature sensor
100: First relay operation detector section
101: $11^{th}$ Capacitor
102: $11^{th}$ Resistor
103: $12^{th}$ Resistor
104: $13^{th}$ Resistor
105: $14^{th}$ Resistor
106: $15^{th}$ Resistor
107: $16^{th}$ Resistor
108: $11^{th}$ Variable resistor
109: $11^{th}$ Inductor
111: First photocoupler
112: $11^{th}$ LED
200: Second relay operation detector section
201: $21^{th}$ Capacitor
202: $21^{th}$ Resistor
203: $22^{th}$ Resistor
204: $23^{rd}$ Resistor
205: $24^{th}$ Resistor
206: $25^{th}$ Resistor
207: $26^{th}$ Resistor
208: $21^{th}$ Variable resistor
209: $21^{th}$ Inductor
211: Second photocoupler
212: $21^{th}$ LED
301: External communication IC
302: Main controller
303: Power supply
304: Line filter
305: Relay drive IC
306: First temperature sensor connection section
307: High and Low temperature control variable-resistors
308: First and second relays
400: Cooling and heating bandwidth temperature control unit
A: Contact A of first and second relays
B: Contact B of first and second relays
TH: High temperature
Tref: Reference Temperature
TL: Low temperature
Vcc1: First power source (5V to 12V)
Vcc2: Second power source (2.5V to 3.3V)
X, X': Cut contacts of first line 24
Y, Y': Cut contacts of second line 25

What is claimed:

1. A cooling and heating bandwidth temperature control apparatus, comprising:
   a cooling and heating temperature control apparatus;
   a first temperature sensor for detecting a temperature;
   first and second lines for connecting the first temperature sensor to the cooling and heating temperature control apparatus; and
   a first relay of the cooling and heating temperature control apparatus with at least two switch sections, wherein a first switch section of the at least two switch sections to determine a connection between first cut contacts of the first line and a second switch section of the at least two switch sections to determine a connection between second cut contacts of the second line,
   wherein if the first relay is in a first contact, the first temperature sensor is connected to the cooling and heating temperature control apparatus, and
   if the first relay is in a second contact, the cooling and heating temperature control apparatus is connected to a high temperature control resistor for heating by the cooling and heating temperature control apparatus and a low temperature control resistor for cooling by the cooling and heating temperature control apparatus through a second relay so as to control a temperature in a bandwidth.

2. A cooling and heating bandwidth temperature control apparatus, comprising:
   a cooling and heating temperature control apparatus;
   a first temperature sensor for detecting a temperature;
   first and second lines for connecting the first temperature sensor to the cooling and heating temperature control apparatus;
   a first relay of a cooling and heating temperature control apparatus with at least two switch sections, wherein a first switch section of the at least two switch sections to determine a connection between first cut contacts of the first line and a second switch section of the at least two switch sections to determine a connection between second cut contacts of the second line;
   a second relay of the cooling and heating temperature control apparatus to determine a connection to a high temperature control resistor for heating by the cooling and heating temperature control apparatus and a low temperature control resistor for cooling by the cooling and heating temperature control apparatus; and
   a relay drive circuit for driving the first and second relays.

3. The apparatus of claim 1, wherein the first and second relays are a relay that two switches in a single relay act simultaneously as the first contact or the second contact.

4. The apparatus of claim 1, wherein a cooling and heating bandwidth temperature control unit is provided between the cooling and heating temperature control apparatus and the first temperature sensor.

5. A cooling and heating bandwidth temperature control apparatus, comprising:
   a cooling and heating temperature control apparatus;
   a first temperature sensor for detecting a temperature;
   first and second lines for connecting the first temperature sensor to the cooling and heating temperature control apparatus;

a first relay of the cooling and heating temperature control apparatus with at least two switch sections, wherein a first switch section of the at least two switch sections to determine a connection between first cut contacts of the first line and a second switch section of the at least two switch sections to determine a connection between second cut contacts of the second line;

a second relay of the cooling and heating temperature control apparatus to determine a connection to a high temperature control resistor for heating by the cooling and heating temperature control apparatus or a low temperature control resistor for cooling by the cooling and heating temperature control apparatus;

the second relay comprising a first switch section of the second relay and a second switch section of the second relay;

a first relay control electromagnet for directing the first switch section of the first relay and the second switch section of the first relay to a first contact or a second contact;

a second relay control electromagnet for directing the first switch section of the second relay and the second switch section of the second relay to the first contact or the second contact;

a relay drive circuit for driving the first and second relays;

a high temperature control resistor for setting a high temperature; and a low temperature control resistor for setting a low temperature, wherein after receiving a set reference temperature from an external communication circuit, an actual temperature is controlled between the high temperature and the reference temperature, or the actual temperature is controlled between the low temperature and the reference temperature.

6. A cooling and heating bandwidth temperature control apparatus, comprising:

a cooling and heating temperature control apparatus;

a first temperature sensor for detecting a temperature;

first and second lines for connecting the first temperature sensor to the cooling and heating temperature control apparatus;

a first relay of the cooling and heating temperature control apparatus with at least two switch sections, wherein a first switch section of the at least two switch sections to determine a connection between first cut contacts of the first line and a second switch section of the at least two switch sections to determine a connection between second cut contacts of the second line; and a second relay of the cooling and heating temperature control apparatus to determine a connection to a high temperature control resistor for heating by the cooling and heating temperature control apparatus or a low temperature control resistor for cooling by the cooling and heating temperature control apparatus, wherein the second relay comprises a first switch section of the second relay and a second switch section of the second relay.

7. The apparatus of claim 5, wherein detection of whether the first switch section of the first relay is in the first contact or the second contact is carried out by means of a first photocoupler, and detection of whether the second switch section of the first relay is in the first contact or the second contact is carried out by means of a second photocoupler and detected information is forwarded to a main controller.

* * * * *